(12) United States Patent
Chan et al.

(10) Patent No.: US 7,293,728 B2
(45) Date of Patent: Nov. 13, 2007

(54) ELECTRIC SPICE MILL

(75) Inventors: Kit Hon Chan, Hong Kong (CN); Kam Man Chan, Hong Kong (CN); George Bigelow, Hong Kong (CN)

(73) Assignee: Trudeau Corporation 1889 Inc., Boucherville, Quebec (CA)

( * ) Notice: Subject to any disclaimer, the term of this patent is extended or adjusted under 35 U.S.C. 154(b) by 0 days.

(21) Appl. No.: 11/131,759

(22) Filed: May 18, 2005

(65) Prior Publication Data

US 2006/0261197 A1 Nov. 23, 2006

(51) Int. Cl.
*A47J 17/00* (2006.01)
*A47J 43/00* (2006.01)

(52) U.S. Cl. .................... 241/169; 241/169.1

(58) Field of Classification Search ........... 241/169, 241/169.1, 168; 361/2–14
See application file for complete search history.

(56) References Cited

U.S. PATENT DOCUMENTS

| | | | | |
|---|---|---|---|---|
| 3,734,417 A | * | 5/1973 | Russell et al. | 241/168 |
| 3,912,941 A | * | 10/1975 | Passarella | 361/2 |
| 4,307,808 A | * | 12/1981 | Johnson | 209/614 |
| 5,134,255 A | * | 7/1992 | Tetrault et al. | 200/61.45 R |
| 5,675,228 A | | 10/1997 | O'Bryan | |
| 6,443,377 B1 | | 9/2002 | Cheng | |
| 6,443,378 B1 | | 9/2002 | Huang et al. | |
| 6,830,205 B2 | * | 12/2004 | Wang | 241/169.1 |
| 7,077,347 B1 | * | 7/2006 | Wang | 241/169.1 |

* cited by examiner

*Primary Examiner*—Bena Miller

(57) ABSTRACT

An electric spice mill comprising a power unit coupled to the motor of the mill, the power unit comprising: (i) first and second electric circuits; (ii) a switch in electrical contact with said first and said second electric circuits; and (iii) an actuator movable between first and second positions, wherein, in the first position, the actuator prevents current flow in the first electric circuit and, in the second position, the actuator allows a first current to flow in the first electric circuit and the switch is responsive to the first current in the first electric circuit to allow a second current to flow in the second electric circuit such that the grinding unit of the mill is driven by the motor.

11 Claims, 4 Drawing Sheets

US 7,293,728 B2

ELECTRIC SPICE MILL

FIELD OF THE INVENTION

The present invention relates to an electric spice mill comprising a power unit with first and second electric circuits.

BACKGROUND OF THE INVENTION

U.S. Pat. No. 6,830,205 entitled Electric Pepper Mill issued on Dec. 14, 2004 discloses an electric pepper mill comprising a motor; batteries; a conducting element movable between an action position when the pepper mill is inverted, wherein it closes a circuit consisting of the motor and the batteries and a non-action position when the pepper mill is upright, wherein the circuit is opened; and a cover being capable of connecting the batteries together in a first position, and being out of electrical contact with the batteries when turned to a second position; whereby when the cover is in the first position, the motor is powered by the batteries, and in turns, the pepper mill works to grind pepper when the mill is inverted, and the pepper mill stops working when it is in the upright position. Due to the high current thought the circuit, sparks may be generated by the conducting element each time it closes the circuit and there is a need to provide an electric spice mill comprising a power unit that reduces the likelihood of generating such sparks.

SUMMARY OF THE INVENTION

As embodied and broadly described herein, the invention provides an electric spice mill comprising: (a) a main body for receiving spice corns; (b) a motor mounted in the main body; (c) a grinding unit for grinding the spice corns, the grinding unit being coupled to the motor and the motor being operative to drive the grinding unit; and (d) a power unit coupled to the motor. The power unit comprises (i) first and second electric circuits; (ii) a switch in electrical contact with the first and second electric circuits; and (iii) an actuator movable between first and second positions, wherein, in the first position, the actuator prevents current flow in the first electric circuit and, in the second position, the actuator allows a first current to flow in the first electric circuit and the switch is responsive to the first current in the first electric circuit to allow a second current to flow in the second electric circuit such that the grinding unit is driven by the motor.

The invention also provides an electric spice mill comprising: (a) a main body for receiving spice corns; (b) a motor mounted in the main body; (c) a grinding unit for grinding the spice corns, the grinding unit being coupled to the motor and the motor being operative to drive the grinding unit; and (d) a power unit coupled to the motor. The power unit comprises (i) first and second electric circuits; (ii) a switch in electrical contact with the first and second electric circuits; and (iii) an actuator movable between first and second positions, wherein, in the first position, the electric spice mill is in a generally upright position and the actuator prevents current flow in the first electric circuit and, in the second position, the electric spice mill is an upside down position and the actuator allows a first current to flow in the first electric circuit and the switch is responsive to the first current in the first electric circuit to allow a second current to flow in the second electric circuit such that the grinding unit is driven by the motor.

The invention further provides an electric spice mill comprising: (a) a main body for receiving spice corns; (b) a motor mounted in the main body; (c) a grinding unit for grinding the spice corns, the grinding unit being coupled to the motor and the motor being operative to drive the grinding unit; and (d) a power unit coupled to the motor. The power unit comprises: (i) first and second electric circuits; (ii) a switch in electrical contact with the first and second electric circuits; and (iii) a metallic ball movable between first and second positions for opening and closing a contact located in the first electric circuit, wherein, in the first position, the electric spice mill is in a generally upright position and the metallic ball opens the contact for preventing current flow in the first electric circuit and, in the second position, the electric spice mill is an upside down position and the metallic ball closes the contact for allowing a first current to flow in the first electric circuit and the switch is responsive to the first current in the first electric circuit to allow a second current to flow in the second electric circuit such that the grinding unit is driven by the motor.

Other objects and features of the invention will become apparent by reference to the following description and the drawings.

BRIEF DESCRIPTION OF THE DRAWINGS

A detailed description of the embodiments of the present invention is provided herein below, by way of example only, with reference to the accompanying drawings, in which.

Figure 1:
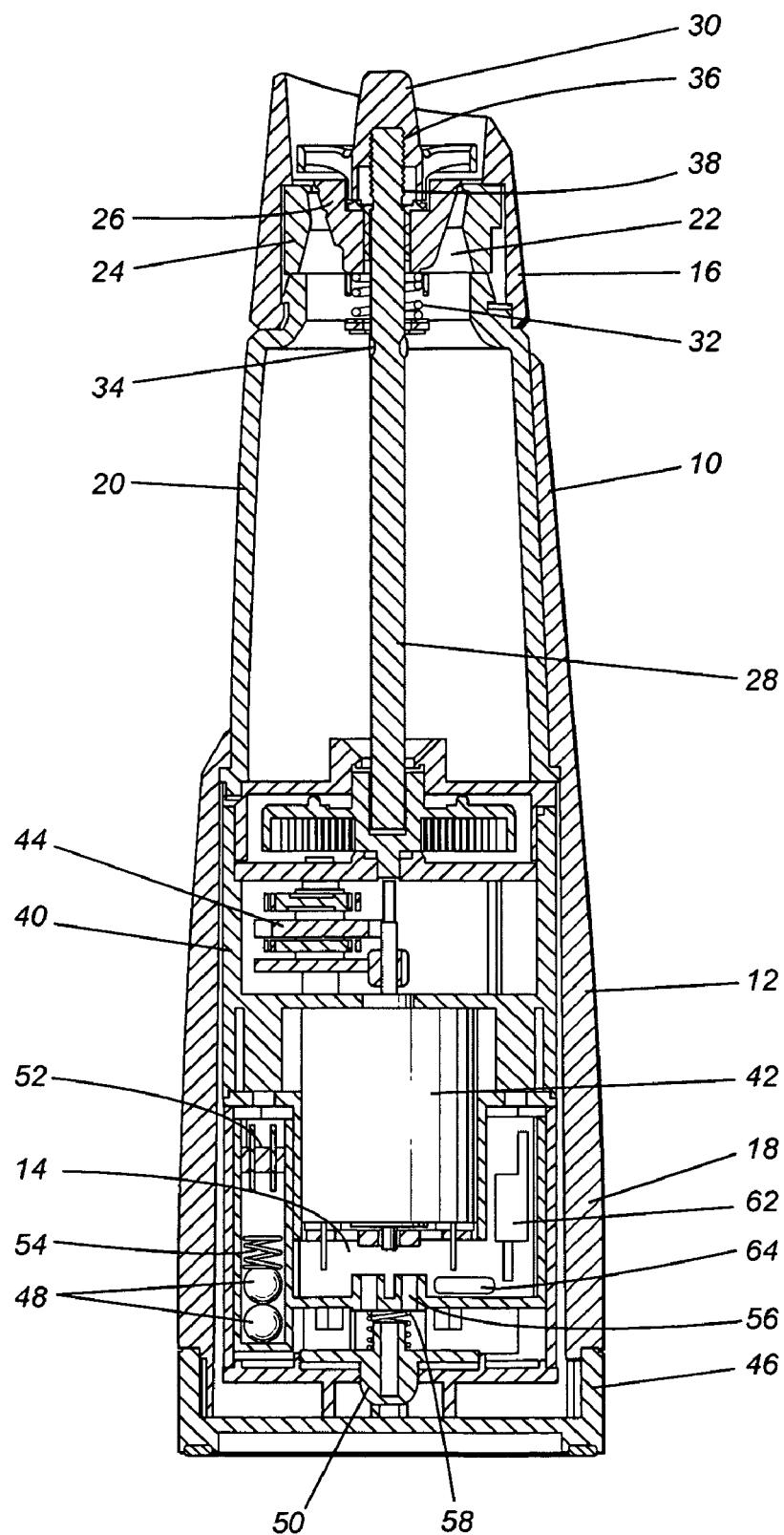
FIG. 1 is a sectional view of an electric spice mill constructed in accordance with an embodiment of the invention and shown in a generally upright position.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF THE EMBODIMENTS

To facilitate the description, any reference numeral designating an element in one figure will designate the same element if used in any other figures. In describing the embodiments, specific terminology is resorted to for the sake of clarity but the invention is not intended to be limited to the specific terms so selected, and it is understood that each specific term comprises all equivalents.

Figure 2:
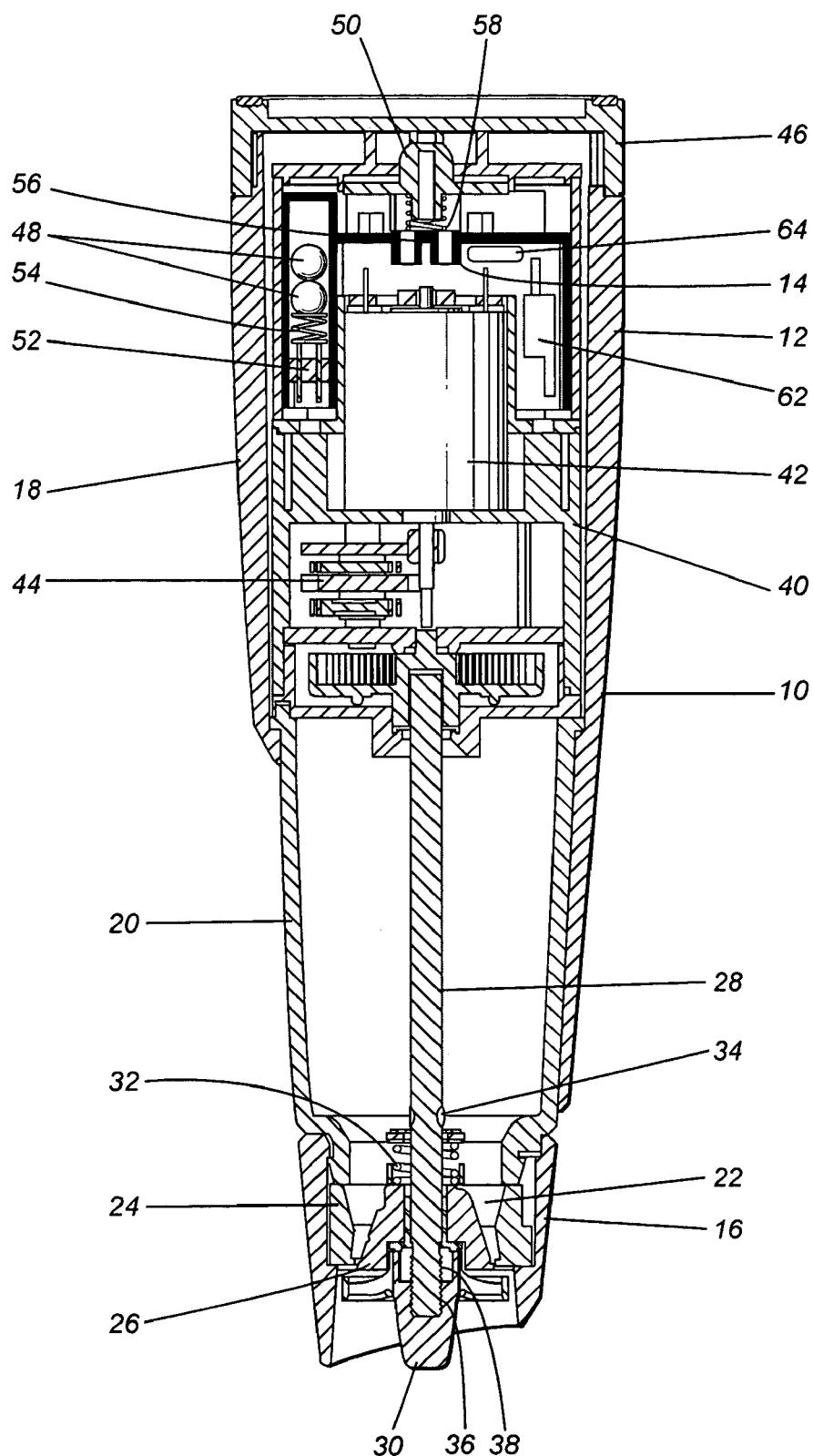
FIG. 2 is a sectional view of the electric spice mill of FIG. 1 shown in an upside down position.

Referring to FIGS. 1 and 2, an electric spice mill 10 has a main body 12 for receiving a power unit 14 and the spice (pepper, salt, etc.) corns to be ground. The main body 12 may comprise a top housing 16, a bottom housing 18 and an intermediate shell 20, which may be transparent for allowing a user to see the remaining corns in the spice mill 10. Note that terms such as "top" and "bottom" are used herein when referring to the spice mill 10 in the generally upright position shown in FIG. 1. The intermediate shell 20 is slidingly fitted in the bottom housing 18 while the top housing 16 is mounted at one end of the intermediate shell 20. The power unit 14 has a casing 40 for receiving a motor 42 connected to a shaft 28 via a transmission unit 44. A cover 46 is mounted on the bottom housing 18.

The top housing 16 receives a grinding unit 22, which has an outer grinding member 24 and an inner grinding member 26 mounted on the shaft 28. The inner grinding member 26 has teeth on its outer side and a hole in which the shaft 28 passes. The outer grinding member 24 has teeth on its inner side and is fixedly mounted in the bottom housing 18 such that it cannot move or rotate. Hence, the inner grinding member 26 can rotate relative to the outer grinding member 24 for grinding the spice corns when driven by the motor 42 via the shaft 28.

The inner grinding member 26 is located between a knob 30 and a spring 32 that abuts at one end against small protrusions 34 provided on the shaft 28. The knob 30 has an internal threaded portion 36 registering with a threaded portion 38 provided on the shaft 28. It is understood that the distance between the outer and inner grinding members 24, 26 may be adjusted by turning the knob 30. Specifically, by turning the knob 30 in the clockwise direction, the inner grinding member 26 moves closer to the outer grinding member 24, and by turning the knob 30 in the counterclockwise direction, the inner grinding member 26 moves away from the outer grinding member 24. Hence, the user can choose the desired size of spice particles by turning the knob 30.

Figure 3:
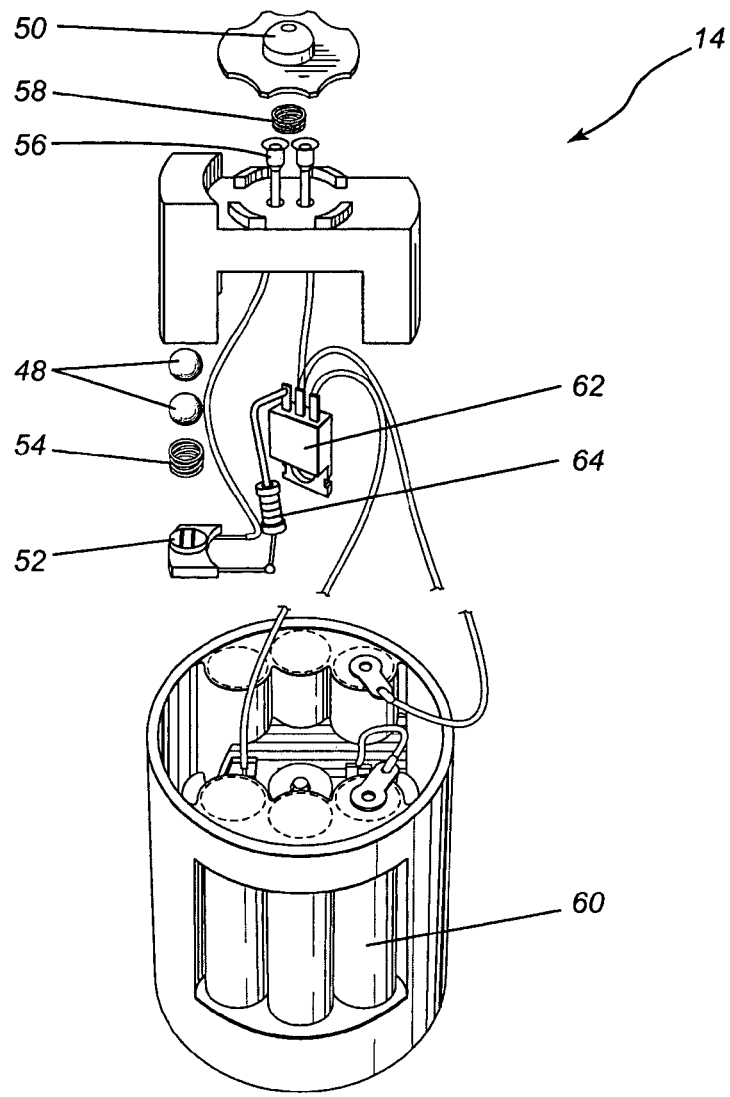
FIG. 3 is an exploded perspective view of a power unit for the electric spice mill of FIG. 1.

As best shown in FIGS. 3 to 6, the power unit 14 has first and second actuators 48, 50 and also comprises a first contact 52 and a first biasing element 54 mounted between the first actuator 48 and first contact 52; and a second contact 56 and a second biasing element 58 mounted between the second actuator 50 and second contact 56. The first actuator 48 may be metallic balls as shown in FIGS. 1 to 3, the second actuator 50 may be a push button as shown in FIGS. 1 to 3 and the biasing elements 54, 58 may be springs as shown in FIGS. 1 to 3.

Figure 4:
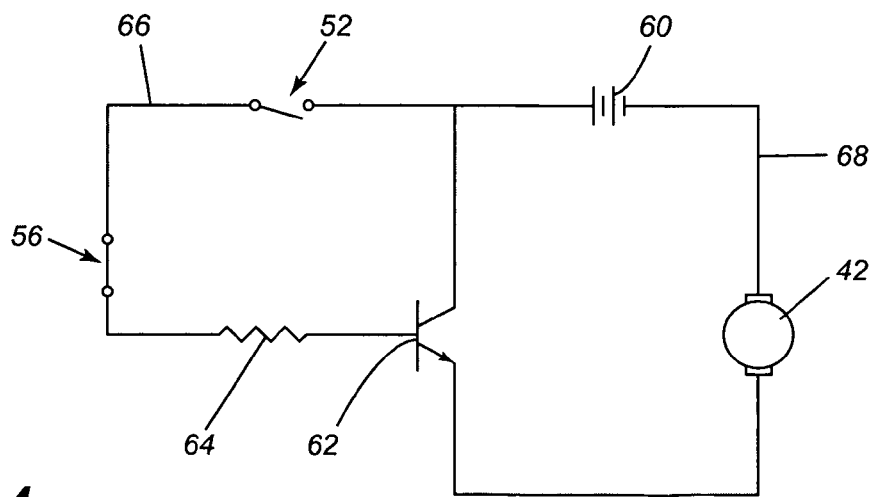
FIG. 4 is an electric schema showing the electric circuits of the power unit in a first operative mode.
Figure 5:
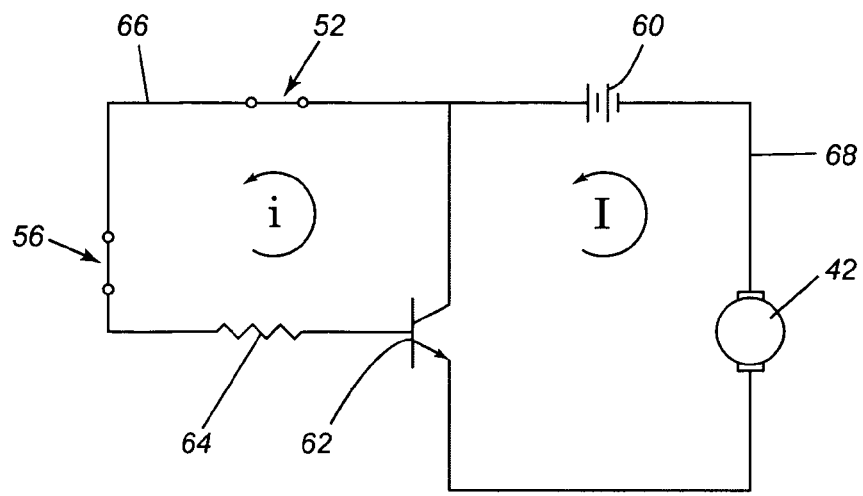
FIG. 5 is an electric schema showing the electric circuits of the power unit in a second operative mode.
Figure 6:
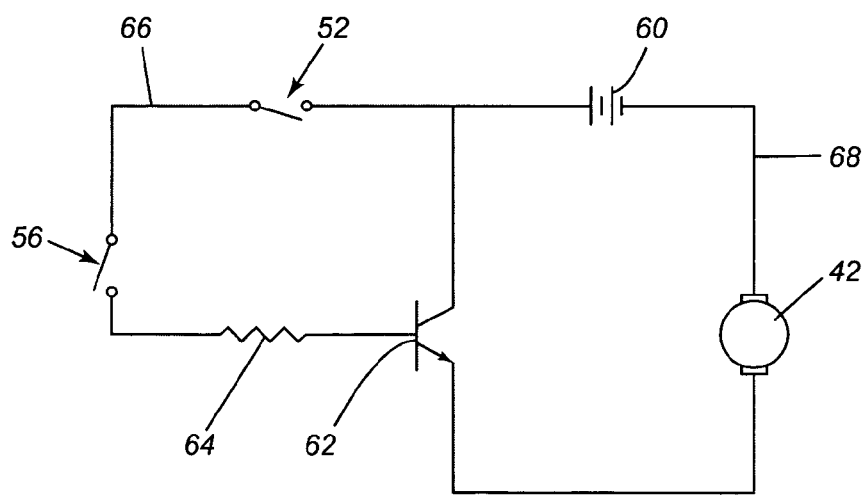
FIG. 6 is an electric schema showing the electric circuits of the power unit in a third operative mode.

The power unit 14 also comprises batteries 60 connected to the motor 42. All these components are connected to a switch 62, which is in contact with first and second electric circuits 66, 68 such that the second electric circuit 68 is controlled by the first electric circuit 66. The first actuator 48 is capable of opening and closing the first contact 52 located in the first electric circuit 66, the second actuator 50 is capable of opening and closing the second contact 56 located in the first electric circuit 66, and the first electric circuit 66 also comprises a resistor 64 located between the second contact 56 and switch 62. The switch 62 may be a transistor such as a NPN silicon power transistor TIP41C with the following maximum values: a continuous collector current of 6A, a peak collector current of 10A, and a collector-emitter voltage of 100V. As shown in FIGS. 4 to 6, the batteries 60 and motor 42 are located in the second electric circuit 68.

The first actuator 48 is movable between a first position wherein the pepper mill is in a generally upright position, as shown in FIG. 1, and a second position wherein the pepper mill is in an upside down, position, as shown in FIG. 2. It is understood that the second position corresponds to a position of the spice mill 10 wherein the user inverts the spice mill 10 such that ground spice particulars can exit from the spice mill 10. In that sense, the second position may correspond to a position wherein the spice mill 10 is inverted at 45° for example. As indicated above, the power unit 14 has a first biasing element 54 located between the first actuator 48 and the first contact 52 for absorbing the first actuator 48 such that the first contact 52 is only closed once when the spice mill 10 is moved to the second position.

In the first position, because the first actuator 48 does not contact the first contact 52, the first contact 52 remains opened as shown in FIG. 4 and the first actuator 48 therefore prevents current flow in the first electric circuit 66.

In the second position, because the first actuator 48 contacts the first contact 52, the first contact 52 is closed as shown in FIG. 5 and the first actuator 48 therefore allows a first current i to flow in the first electric circuit 66 and the switch 62 is then responsive to the first current i to allow a second current I to flow in the second electric circuit 68 such that the grinding unit 22 is driven by the motor 42.

The first and second currents i, I have respective amperages $Ai$, $AI$ wherein $Ai$ is smaller that $AI$ and the resistor 64 may have a resistance of 8 ohms to 22 ohms. A person skilled in the art will understand that by choosing the proper resistor 64, switch 62, batteries 60, grinding unit 22 and motor 42, it is possible to obtain a second electric circuit controlled by a first electric circuit such that the grinding unit 22 is driven by the motor 42 only when the first actuator 48 is in the second position.

As indicated above, the power unit 14 also comprises a second actuator 50 is capable of opening and closing the second contact 56 located in the first electric circuit 66 as shown in FIGS. 4 to 6. The second actuator 50 may be a push button accessible by the user. Alternatively, as illustrated in FIGS. 1 and 2, the second actuator 50 may be a push button that is pressed when the cover 46 is mounted on the main body 12. In that way, because the second actuator 50 is pressed when the cover 46 is mounted on the main body 12, the second actuator 50 contacts the second contact 56 closing it as shown in FIGS. 4 and 5. When the cover 46 is removed from the main body 12, the second contact 56 is opened as shown in FIG. 6, and no current flows into the switch 62. Thus, even if the first contact 52 is closed by the first actuator 48, with no current flowing into the switch 60, the switch 60 does not allow sufficient current flow into the motor 42 to drive the grinding unit 22 irrespective of the position of the spice mill 10. The cover may also be turnable between first and second positions, wherein, in the first position, the cover presses the second actuator 50 for closing the second contact 52, and in the second position, the cover frees the second actuator 50 for opening the second contact 52.

In use, when the cover 46 is mounted on the bottom housing 18 of the spice mill 10, the second actuator 50 is pressed for closing the first contact 56. When the spice mill 10 is turned to the second position, the first actuator 48 contacts the first contact 52 such that the first contact 52 is closed. Because both first and second contacts 52, 56 are closed as shown in FIG. 5, a first current i will flow in the first electric circuit 66 and into the switch 62, which will then allow a second electric current I to flow into the second electric circuit 68 and the motor 42, the current I being sufficient such that the grinding unit 22 is driven by the motor 42.

To stop the spice mill 10, the spice mill 10 is turned to the first position so that the first actuator 48 is away from the first contact 52, thereby opening the first electric circuit 66, once again preventing flow of current into the switch 62 which in turns does not allow sufficient current flow into the motor 42 to drive the grinding unit 22.

In order to add spice corns into the main body 12, the cover 46 is removed from the bottom housing 18 of the spice mill 10. Because the second actuator 50 will be depressed once the cover 46 is removed, the second contact 56 will then be opened as shown in FIG. 6 and the motor 42 will not receive sufficient current flow to drive the grinding unit 22, irrespective of which position of the spice mill 10 is moved to. The power unit 14 is afterwards removed from the main body 12 and the user may then add spice corns into the main body 12.

Once the spice corns are added into the main body 12, the user can mount the power unit 14 on the shaft 28 and the second contact 56 will only be closed when the cover 46 will be mounted again on the bottom housing 18 of the spice mill 10. Then, when the spice mill 10 is turned to the second position, the first actuator 48 contacts the first contact 52 such that the first contact 52 is closed. Because both first and second contacts 52, 56 are closed, a first current i will flow in the first electric circuit 66 and into the switch 62, which will then allow a second electric current I to flow into the second electric circuit 68 and the motor 42, the current I being sufficient such that the grinding unit 22 is driven by the motor 42.

The above description of preferred embodiments should not be interpreted in a limiting manner since other variations, modifications and refinements are possible within the spirit and scope of the present invention. The scope of the invention is defined in the appended claims and their equivalents.

The invention claimed is:

1. An electric spice mill comprising:
   (a) a main body for receiving spice corns;
   (b) a motor mounted in said main body;
   (c) a grinding unit for grinding the spice corns, said grinding unit being coupled to said motor, said motor being operative to drive said grinding unit;
   (d) a power unit coupled to said motor, said power unit comprising:
      i) first and second electric circuits, said first electric circuit comprising first and second contacts and said second electric circuit comprising said motor;
      ii) a switch in electrical contact with said first and second electric circuits, and wherein said first electric circuit further comprises a resistor positioned between said first contact and said switch;
      iii) a first actuator being a metallic ball movable between first and second positions and capable of opening and closing said first contact, wherein, in said first position, said metallic ball prevents current flow in said first electric circuit and, in said second position, said metallic ball allows a first current to flow in said first electric circuit and said switch is responsive to said first current in said first electric circuit to allow a second current to flow in said second electric circuit such that said grinding unit is driven by said motor, and wherein said first and second current have respective first and second amperages, said first amperage being smaller than said second amperage; and
      iv) a spring between said metallic ball and said first contact; and
   (e) a second actuator capable of opening and closing said second contact, said second actuator being movable between first and second positions, wherein, in said first position, said second actuator prevents current flow in said first electric circuit and, in said second position, said second actuator allows a first current to flow in said first electric circuit.

2. An electric spice mill as defined in claim 1, wherein said first amperage is less than 10% of said second amperage.

3. An electric spice mill as defined in claim 1, wherein said grinding unit is coupled to said motor via a shaft and comprises an outer grinding member mounted to said main body and an inner grinding member mounted at one end of said shaft.

4. An electric spice mill as defined in claim 1, wherein said switch comprises a transistor.

5. An electric spice mill as defined in claim 1, wherein said resistor has a resistance between 8 ohms and 22 ohms.

6. An electric spice mill as defined in claim 1, wherein, when said second actuator is in said first position, said motor does not receive sufficient current to drive said grinding unit, irrespective of which position of said spice mill is moved to.

7. An electric spice mill as defined in claim 1, wherein said second actuator is accessible by a user.

8. An electric spice mill as defined in claim 7, wherein said second actuator is in said second position when a user presses it.

9. An electric spice mill as defined in claim 1, further comprising a cover mounted at one end of said main body proximate to said second actuator and wherein said second actuator is in said second position when said cover is affixed to said main body.

10. An electric spice mill as defined in claim 1, further comprising a cover mounted at one end of said main body proximate to said second actuator and wherein said second actuator is in said first position when said cover is in a first position and said second actuator is in said second position when said cover is in a second position.

11. An electric spice mill as defined in claim 1, further comprising a cover mounted at one end of said main body, wherein the second actuator is a push button accessible by a user and wherein said push button is in said second position when the user presses it.

* * * * *